United States Patent [19]

Kojima

[11] Patent Number: 5,181,496
[45] Date of Patent: Jan. 26, 1993

[54] AIR/FUEL RATIO CONTROL APPARATUS IN AN INTERNAL COMBUSTION ENGINE

[75] Inventor: Shinji Kojima, Himeji, Japan

[73] Assignee: Mitsubishi Denki Kabushiki Kaisha, Tokyo, Japan

[21] Appl. No.: 783,872

[22] Filed: Oct. 29, 1991

[30] Foreign Application Priority Data

Oct. 30, 1990 [JP] Japan .................... 2-290726

[51] Int. Cl.$^5$ ............................. F02D 41/12
[52] U.S. Cl. ................................. 123/493
[58] Field of Search ....................... 123/493

[56] References Cited

U.S. PATENT DOCUMENTS

| | | | |
|---|---|---|---|
| 4,127,086 | 11/1978 | Harada et al. | 123/493 |
| 4,184,458 | 1/1980 | Aoki et al. | 123/493 |
| 4,204,483 | 5/1980 | Harada et al. | 123/493 |
| 4,359,993 | 11/1982 | Carlson | 123/493 |
| 4,984,552 | 1/1991 | Nishizawa et al. | 123/492 |

FOREIGN PATENT DOCUMENTS

| | | | |
|---|---|---|---|
| 49-45646 | 12/1974 | Japan . | |
| 52-97031 | 8/1977 | Japan . | |
| 63-186941 | 8/1988 | Japan | 123/493 |
| 2-275034 | 11/1990 | Japan | 123/493 |

*Primary Examiner*—Andrew M. Dolinar
*Attorney, Agent, or Firm*—Sughrue, Mion, Zinn, Macpeak and Seas

[57] ABSTRACT

An air/fuel ratio control apparatus for a fuel injection type internal combustion engine is able to prevent an air/fuel mixture supplied to the engine from becoming excessively lean even immediately after engine decelerations and thus provide an optimum air/fuel ratio at all times during engine operation. An engine operating parameter sensor such as a pressure sensor, a flow meter, etc., periodically senses an engine operating parameter such as the intake pressure in an intake manifold, the flow rate of intake air sucked into the engine, and the like. A deceleration sensor senses the beginning of engine deceleration. An engine control unit including a microprocessor calculates, from the output signal of the engine operating parameter sensor, a change in the engine operating parameter between two consecutive points in time, and it further calculates a corrected amount of injection fuel supplied to the engine on the basis of the change in the engine operating parameter thus obtained. The control unit controls the fuel injector such that the fuel injector can supply the corrected amount of fuel to the engine during a predetermined length of time from the beginning of engine deceleration. In addition, the length of time, during which the fuel injector can supply the corrected amount of fuel to the engine, or the corrected amount of injection fuel, can be increased in accordance with the decreasing engine temperature.

6 Claims, 6 Drawing Sheets

AIR/FUEL RATIO CONTROL APPARATUS IN AN INTERNAL COMBUSTION ENGINE

BACKGROUND OF THE INVENTION

This invention relates to an air/fuel ratio control apparatus in an internal combustion engine which is particularly suitable for correcting a deviation from a desired optimum air/fuel ratio occurring during transitional periods of engine operation.

FIG. 4 schematically illustrates a typical example of a known air/fuel ratio control apparatus in an internal combustion engine. In this figure, an internal combustion engine illustrated includes a plurality of engine cylinders 1 (though only one is illustrated) each defining therein a combustion chamber 1a to which an intake manifold 2 is connected. A throttle valve 3 is disposed in the intake manifold 2 for controlling the flow rate of an intake air supplied from the ambient atmosphere to the combustion chamber 1a through the intake manifold 2. An engine operating parameter sensing means 4 in the form of a pressure sensor is mounted on the intake manifold 2 at a location downstream of the throttle valve 3 for sensing the internal pressure or intake pressure in a portion of the intake manifold 2 downstream of the throttle valve 3 and generating a corresponding output signal to an engine control unit (ECU) 9 which controls various aspects of engine operation as referred to in detail later. A temperature sensor 10 is mounted on the intake manifold 2 for sensing the temperature of the engine or the temperature of an engine coolant and generating a corresponding output signal to the ECU 9. A rotational speed sensor 5 senses the rotational speed or the number of revolutions per minute of the engine and generates a corresponding output signal in the form of pulses to the ECU 9. A fuel injector 6 is provided in the intake manifold 2 at a location upstream of the throttle valve 3 for injecting an amount of fuel into the intake pipe 2. A throttle sensor 8 is operatively connected with the throttle valve 3 for sensing the opening degree of the throttle valve 3 and generating a corresponding output signal to the ECU 9.

The ECU 9 includes an analog-to-digital (A/D) converter 91 to which the output signals from the pressure sensor 4, the throttle sensor 8 and the temperature sensor 10 are input, an interface circuit 92 which receives the pulsated output signal from the rotational speed sensor 5 and converts the level thereof into an appropriate level, a microprocessor 93, a ROM 94 for storing programs including basic data and the like to be executed by the microprocessor 93 for controlling engine operation, a RAM 95 for temporarily storing data, information and the like calculated or processed by the microprocessor 93, and an output circuit 96 for driving the fuel injector 6. The microprocessor 93 executes a control program stored in the ROM 94, calculates an appropriate amount of fuel required to be supplied to the intake manifold 2 on the basis of data and information input thereto from the various sensors 4, 5, 8 and 10 via the A/D converter 91 and the interface circuit 92, and controls the fuel injector 6 through the output circuit 96 so that the injector 6 injects the amount of fuel thus calculated into the intake manifold 2. Specifically, the microprocessor 93 properly controls the width of a drive pulse generated by the output circuit 96 for driving the fuel injector 6 so as provide the amount of fuel calculated.

The operation of the known apparatus will now be described in detail with reference to a flow chart illustrated in FIG. 5. First in Step 401, the pulsated output signal of the rotational speed sensor 5 representative of the number of revolutions per minute of the engine Ne is read into the microprocessor 93 through the interface circuit 92. In Step 402, the output signal of the pressure sensor 4 representative of the intake pressure (absolute pressure) in the intake manifold 2 is read into the microprocessor 93 through the A/D converter 91. In Step 403, based on the information read into the microprocessor 93 in Steps 401 and 402, the microprocessor 93 calculates a basic amount of fuel $Q_0$ to be injected into the intake pipe 2 using the following equation:

$$Q_0 = K_1 \times Pb \times \eta v$$

where $K_1$ is a constant; and $\eta v$ is a charging efficiency which is predetermined on the basis of the intake pressure Pb in the intake manifold 2 and the rotational speed (rpm) of the engine.

Subsequently in Step 404, the microprocessor 93 converts the amount of fuel $Q_0$ thus calculated into a corresponding pulse width $\tau$ for driving the fuel injector 6 according to the following equation:

$$\tau = K_2 \times Q_0$$

where $K_2$ is a constant.

With the above-described known air/fuel ratio control apparatus, however, the fuel supply from the fuel injector 6 into the intake manifold 2 is cut off during engine deceleration from the standpoints of fuel economy, emission control and the like, as taught by Japanese Patent Publication No. 55-4217. In this case, however, when the engine temperature as sensed by the temperature sensor 10 is low, for example below the freezing point, the cut-off of the fuel supply is cancelled or stopped for the purpose of ensuring stable engine operation. This results in the following drawbacks:

When the driver of a vehicle releases the acceleration pedal and depresses the brake pedal to stop the running vehicle, the throttle valve 3 is rapidly closed so that the intake pressure in the intake manifold 2 downstream of the throttle valve 3 is suddenly decreased to a significant extent, thus impairing combustion of the air/fuel mixture in the combustion chamber 1a of the cylinder 1. As the vehicle speed and the rpm of the engine decrease, the absolute value of the intake pressure in the intake pipe 2 downstream of the throttle valve 3 gradually increases after the sudden fall thereof. Accordingly, during the period immediately after the rapid closure of the throttle valve 3, such a sudden fall in the intake pressure cannot be sensed quickly or instantaneously but with a certain time delay, so the amount of intake air actually sucked into the cylinder 1 becomes greater than that which is calculated based on the intake pressure sensed by the pressure sensor 4. As a result, the actual air/fuel ratio of the mixture becomes much leaner than the optimum air/fuel ratio for the actual intake air sucked into the cylinder 1 through the intake manifold 2. In addition, the decreasing rpm of the engine gradually increases the intake pressure after the closure of the throttle valve 3, thereby reducing the rate of evaporation of fuel in the form of gasoline in the intake manifold 2 or in the combustion chamber 1a. This also serves to further decrease the air/fuel ratio of the mixture. As a result, the operation of the engine, which is operating in particular at low speed such as when it is idling, is greatly impaired. In this case, the change in the intake pressure inside the intake manifold 2 upon engine deceleration is substantially slow as compared with that at the time of engine acceleration, so a conventional method of correcting the air/fuel ratio based on a change in the intake pressure during transitional operating periods of the engine such as accelerating periods is not feasible for this situation.

SUMMARY OF THE INVENTION

In view of the above, the present invention is aimed at overcoming the above-mentioned problems encountered with the known air/fuel ratio control apparatus.

An object of the present invention is to provide a novel and improved air/fuel ratio control apparatus in an internal combustion engine which is able to prevent the mixture from becoming excessively lean even immediately after engine decelerations and thus provide an optimum air/fuel ratio at all times throughout engine operation.

In order to achieve the above object, according to the present invention, there is provided an air/fuel ratio control apparatus in an internal combustion engine comprising: a fuel injector for supplying fuel to an engine; engine operating parameter sensing means for periodically sensing an engine operating parameter and generating a corresponding output signal; a deceleration sensor for sensing the beginning of engine deceleration; and control means for calculating, from the output signal of the engine operating parameter sensing means, a change in the engine operating parameter between two consecutive points in time, the control means being operable to further calculate a corrected amount of injection fuel supplied to the engine on the basis of the change in the engine operating parameter thus obtained, the control means controlling the fuel injector such that the fuel injector can supply the corrected amount of fuel to the engine during a predetermined length of time from the moment at which the deceleration sensor has sensed the beginning of engine deceleration.

In a preferred form, the engine operating parameter sensing means comprises a pressure sensor for sensing the absolute pressure in an intake manifold of the engine and generating a corresponding output signal.

In another preferred form, the engine operating parameter sensing means comprises a flow meter for metering the flow rate of intake air sucked into the engine.

A temperature sensor senses the temperature of the engine and generates a corresponding output signal. The control means is operable to increase the length of time, during which the fuel injector can supply the corrected amount of fuel to the engine, or the corrected amount of injection fuel, in accordance with the decreasing engine temperature.

The above and other objects, features and advantages of the invention will become more readily apparent from the following detailed description of a preferred embodiment of the invention taken in conjunction with the accompanying drawings.

BRIEF DESCRIPTION OF THE DRAWINGS

In the drawings, the same or corresponding parts are identified by the same symbols.

DESCRIPTION OF THE PREFERRED EMBODIMENT

A preferred embodiment of the invention will now be described in detail while referring to the accompanying drawings.

Figure 1:
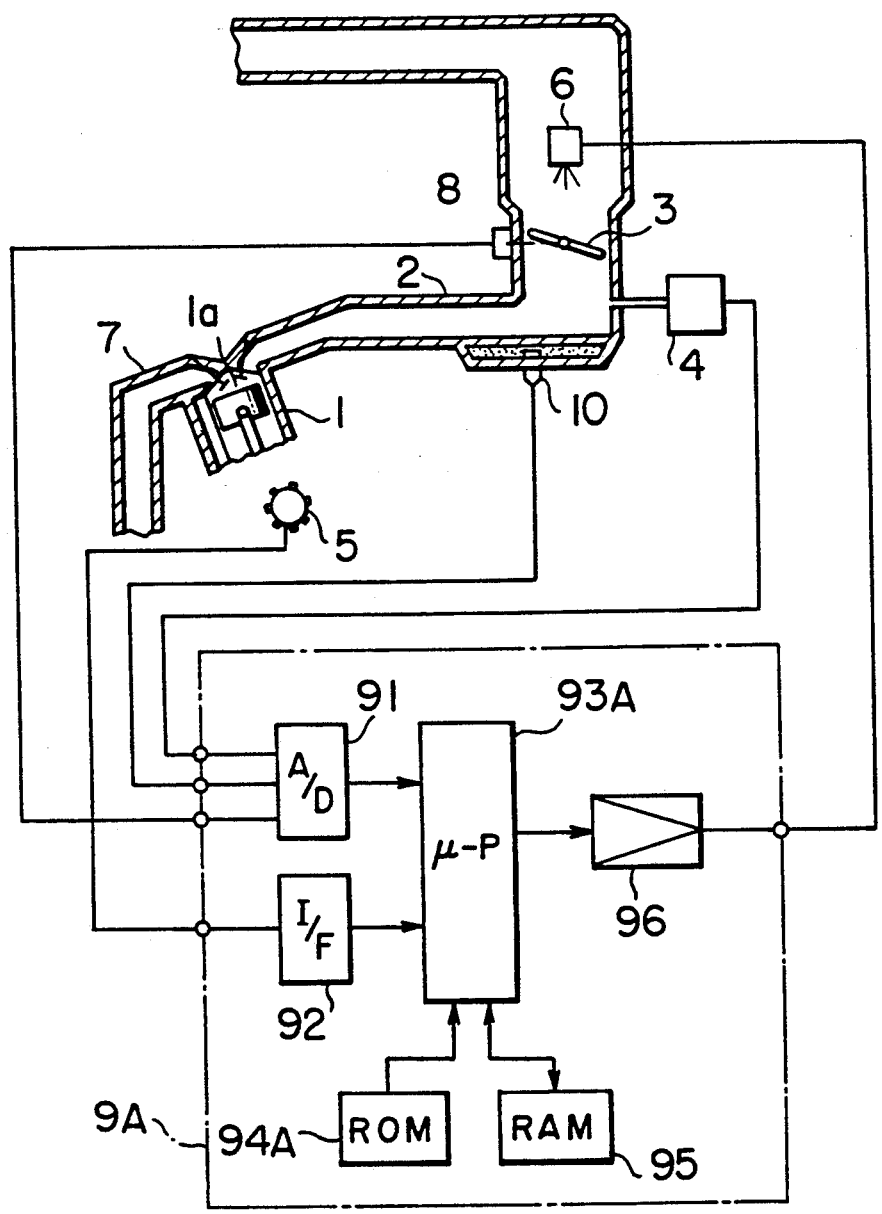
FIG. 1 is a view showing the general arrangement of an internal combustion engine provided with an air/fuel ratio control apparatus constructed in accordance with the present invention.
Figure 4:
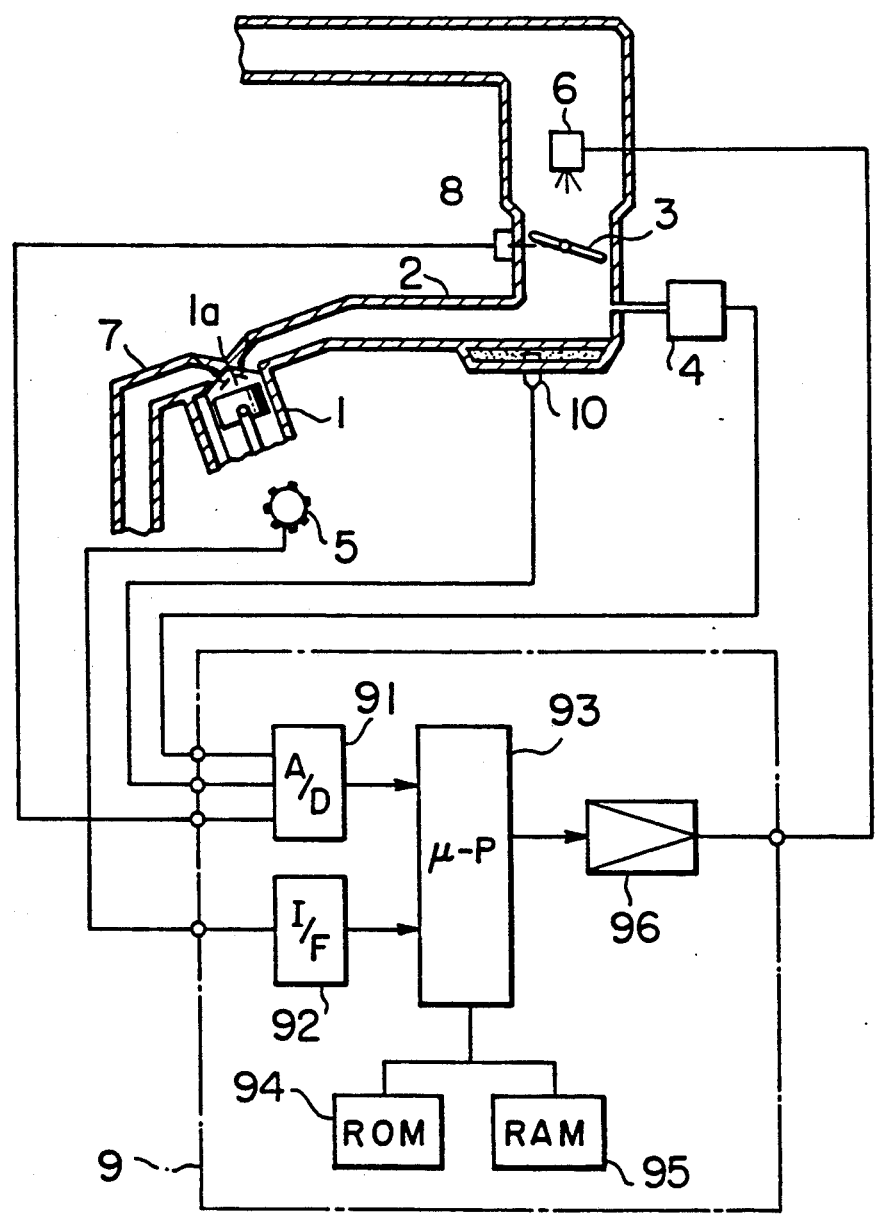
FIG. 4 is a view similar to FIG. 1, but showing a known air/fuel ratio control apparatus in an internal combustion engine.
Figure 5:
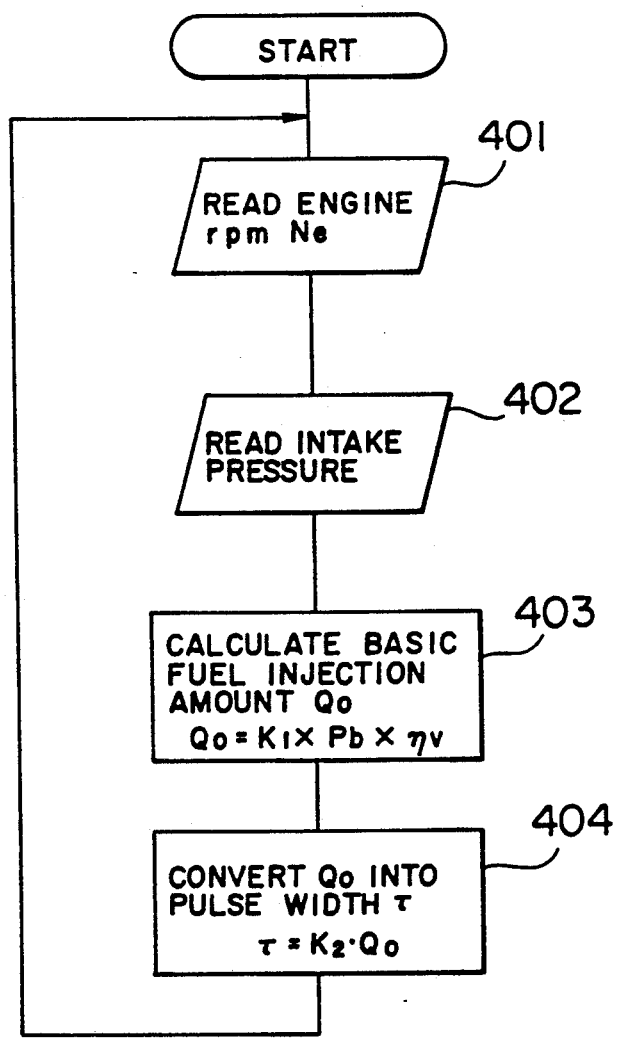
FIG. 5 is a flow chart showing the operational process of the known apparatus of FIG. 4.

Referring to the drawings and first to FIG. 1, there is illustrated an internal combustion engine provided with an air/fuel ratio control apparatus constructed in accordance with the principles of the invention. The engine and the air/fuel ratio control apparatus are substantially similar in construction and operation to those of FIG. 4 except for an engine control unit (ECU) 9A. Specifically, the ECU 9A includes, in addition to an A/D converter 91, an interface circuit 92, a RAM 95 and an output circuit 96, all of which are the same as those of FIG. 4, a microprocessor 93A which performs calculations and data processing different from those of the microprocessor 93 of the aforementioned known apparatus of FIG. 4, and a ROM 94A which stores a control program executed by the microprocessor 93A, the control program being shown in the flow chart of FIG. 2 and different from that of FIG. 5. The control program includes a main routine for controlling a fuel injector 6 under normal engine operation and an interrupt routine which is executed at predetermined time intervals for interrupting or modifying the operation of the main routine upon engine deceleration.

Figure 2:
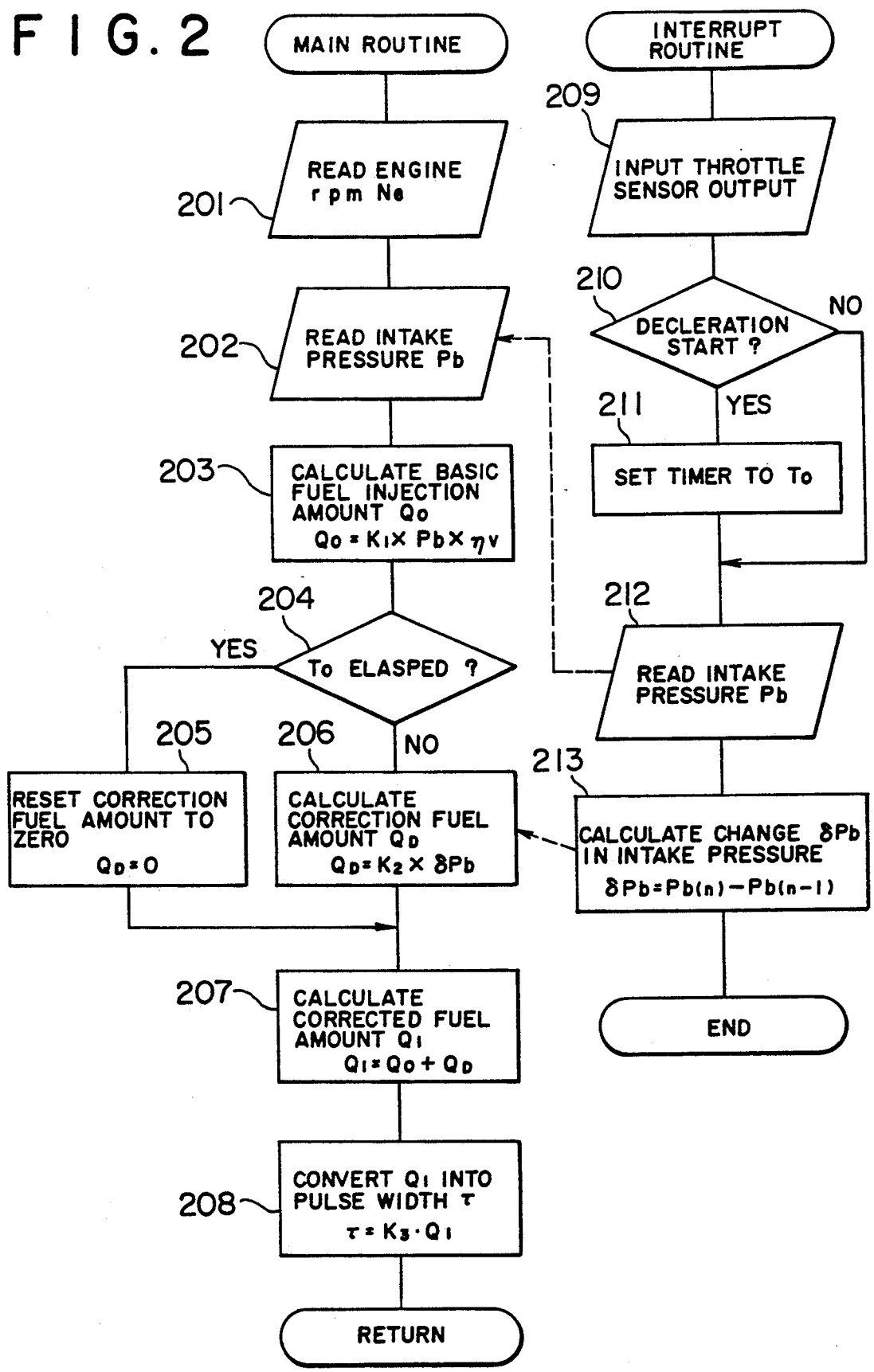
FIG. 2 is a flow chart showing the operational process of the apparatus of FIG. 1.
Figure 3:
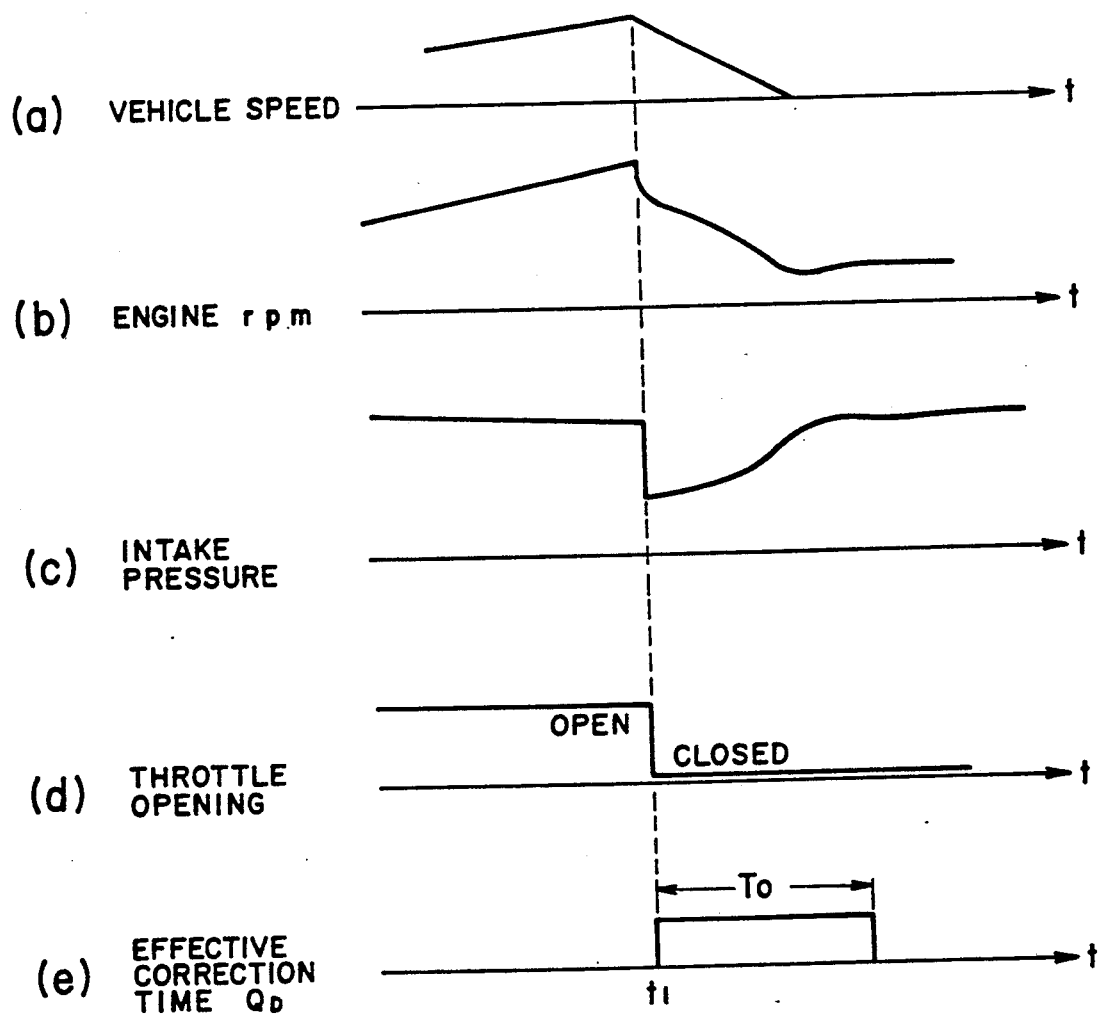
FIG. 3 is a waveform diagram showing the waveforms of the output signals of various sensors and an ECU of FIG. 1.

The operation of the apparatus of the invention as shown in FIG. 1 will be described below with particular reference to FIGS. 2 and 3.

First, the main routine is executed in the following manner. When the main routine has started, in Step 201, the microprocessor 93A reads in the output of the rotational speed sensor 5 representative of the rpm Ne of the engine, and in Step 202, it reads in the output of an engine operating parameter sensing means 4 in the form of a pressure sensor representative of the intake pressure Pb in the intake manifold 2. In Step 203, based on the engine rpm Ne and the intake pressure Pb, the microprocessor 93A calculates a basic amount of fuel to be injected from the injector 6 into the intake manifold 2 using the same equation as in the aforementioned known apparatus. In Step 204, it is determined whether a length of time $T_0$ for for correction of fuel injection, which is preset by an unillustrated timer incorporated in the ECU 9A as described in detail later with reference to the interrupt routine of FIG. 2, has elapsed after the engine begins to decelerate. If the answer is "YES", the program goes to Step 205 where the injection fuel correction is cancelled or reset so that a correction amount of fuel $Q_D$ to be added to the basic fuel injection amount $Q_O$ is made zero. If, however, the answer is "NO", the program goes to Step 206 where the correction amount of injection fuel $Q_D$ is calculated as follows:

$$Q_D = K_2 \times \delta Pb$$

where $K_2$ is a constant, and $\delta Pb$ is an amount of change or deviation between the current intake pressure $Pb_{(n)}$ and the preceding or last intake pressure $Pb_{(n-1)}$ which is calculated in the interrupt routine, as described in detail later. Then in Step 207, the basic fuel injection amount $Q_0$ as obtained in Step 203 is corrected or added by the correction amount of injection fuel $Q_D$ as obtained in Step 206 to provide a corrected amount of injection fuel $Q_1$, which is given by the following equation:

$$Q_1 = Q_0 + Q_D$$

In Step 208, the corrected amount of injection fuel $Q_1$ is converted into a corresponding fuel injection time $\tau$ using the following formula:

$$\tau = K_3 \times Q_1$$

The microprocessor 93A controls the output circuit 96 so that the output circuit 96 generates a drive pulse having a pulse width corresponding to the fuel injection time $\tau$ as calculated in Step 208. As a result, the fuel injector 6 is driven by the drive pulse from the output circuit 96 to inject a predetermined amount of fuel into the intake manifold 2 during the time corresponding to the pulse width of the drive pulse, so that the corrected amount of injection fuel $Q_1$ is supplied to the intake manifold 2. After Step 208, a return is performed.

On the other hand, the interrupt routine is performed periodically at predetermined time intervals in the following manner. First in Step 209, the output signal from the throttle sensor 8 representative of the opening degree of the throttle valve 3 is fed to the microprocessor 93A via the A/D converter 91. Then in Step 209, on the basis of the opening degree of the throttle valve 3, it is determined whether the engine begins to decelerate. In this regard, when the throttle valve 3 is closed (i.e., the output of the throttle sensor 8 changes from a high to a low level at time $t_1$, as shown at (e) in FIG. 3), it is determined that engine deceleration has begun. In this case, due to the closure of the throttle valve 3, the speed of the vehicle decreases as shown at (a) in FIG. 3; the rotational speed or rpm of the engine varies as shown at (b) in FIG. 3; and the intake pressure suddenly falls at time $t_1$ and then gradually increases as shown at (c) in FIG. 3. Thus, if the answer in Step 210 is positive, the program goes to Step 211 where the unillustrated timer incorporated in the ECU 9A is energized to start operation for defining an effective correction period $T_0$ during which the basic fuel injection amount $Q_0$ as calculated in Step 203 is corrected by the correction fuel injection amount $Q_D$ as calculated in Step 206 in the main routine. For example, the correction period $T_0$ is set to be 1-3 seconds. Then, the program proceeds from Step 211 to Step 212. If, however, the answer in Step 210 is negative, the program directly goes to Step 212 while skipping Step 211. In Step 212, the output signal of the pressure sensor 4 representative of the current intake pressure $Pb_{(n)}$ in the intake manifold 2 is input to the microprocessor 93A via the A/D converter 91, as in Step 202 in the main routine. In Step 213, the microprocessor 93A compares the current intake pressure $Pb_{(n)}$ with the last or preceding intake pressure $Pb_{(n-)}$ which is read out from the intake pressure data stored in the RAM 95, so that it calculates a change in the intake pressure or a deviation $\delta Pb$ between the current intake pressure $Pb_{(n)}$ and the last or preceding intake pressure $Pb_{(n-1)}$. The intake pressure deviation $\delta Pb$ thus calculated is used for providing the correction injection fuel amount $Q_D$ in Step 206 in the main routine. Thereafter, the interrupt routine finishes.

In the above description, the effective correction period $T_0$ defined by the unillustrated timer as set in Step 211 can be varied in accordance with the output of the temperature sensor 10 representative of the engine temperature, or the correction amount of injection fuel $Q_D$ as calculated in Step 206 can instead be varied in accordance with the engine temperature by changing the constant $K_2$. This is because with the cold engine, a rich mixture having a low air/fuel ratio is required for proper engine operation as compared with the wormed-up engine. For this reason, the effective correction time $T_0$ and/or the correction amount of injection fuel $Q_D$ are increased as the engine temperature falls.

Although in the above embodiment, the throttle sensor 3 is utilized for determining the beginning of engine deceleration, such a determination can also be made when an idle switch is closed from its open state. In this case, too, substantially the same results will be obtained.

Figure 6:
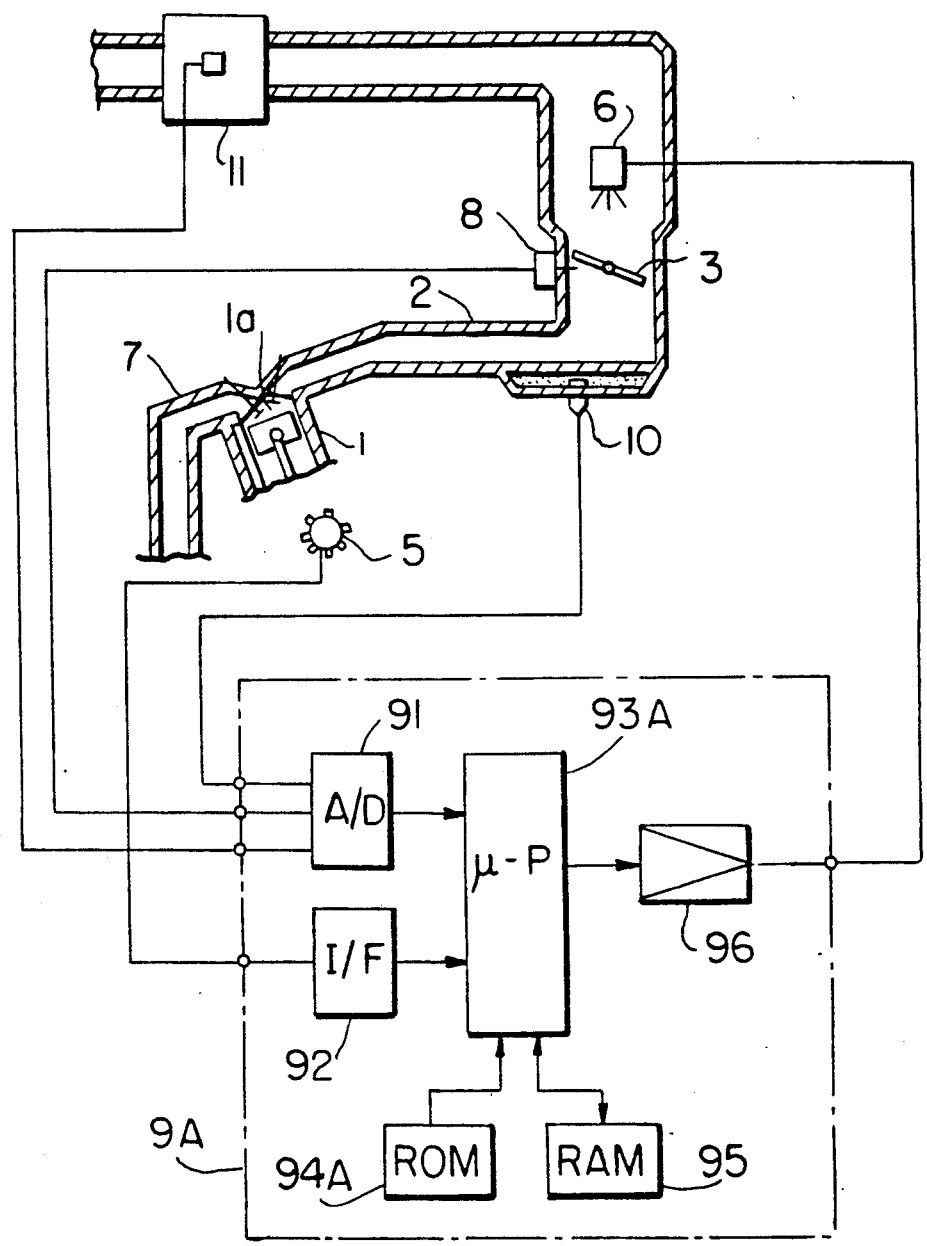
FIG. 6 is a view, similar to FIG. 1, of an alternate embodiment of an air/fuel ratio control apparatus.

In addition, although in the above embodiment, description was made of a speed-density type fuel injection system utilizing a change in the intake pressure as a variable, substantially the same results are obtainable with an L-jetronic type fuel injection system employing, as a variable, a change in the amount of intake air sucked into the engine. Thus, in this case, instead of using a pressure sensor, the engine operating parameter sensing means can take the form of a flow meter 11 which meters the flow rate of intake air sucked into the combustion chamber 1a through the intake manifold 2, as illustrated in FIG. 6.

What is claimed is:

1. An air/fuel ratio control apparatus for an internal combustion engine comprising:
   a fuel injector for supplying fuel to an engine;
   engine operating parameter sensing means for periodically sensing an engine operating parameter and generating a corresponding output signal;
   a deceleration sensor for sensing the beginning of engine deceleration; and
   control means for calculating, from the output signal of said engine operating parameter sensing means, a change in the engine operating parameter between two consecutive points in time, said control means being operable to further calculate a corrected amount of injection fuel supplied to the engine on the basis of the change in the engine operating parameter thus obtained, said control means controlling said fuel injector such that said fuel injector can supply the corrected amount of fuel to the engine during a predetermined length of time from the moment at which said deceleration sensor has sensed the beginning of engine deceleration.

2. An air/fuel ratio control apparatus according to claim 1, wherein said engine operating parameter sensing means comprises a pressure sensor for sensing the absolute pressure in an intake manifold of the engine and generating a corresponding output signal.

3. An air/fuel ratio control apparatus according to claim 1, wherein said engine operating parameter sensing means comprises a flow meter for metering the flow rate of intake air sucked into the engine.

4. An air/fuel ratio control apparatus according to claim 1, further comprising a temperature sensor for sensing the temperature of the engine and generating a corresponding output signal, said control means being operable to increase the length of time, during which said fuel injector can supply the corrected amount of fuel to the engine, in accordance with the decreasing engine temperature.

5. An air/fuel ratio control apparatus according to claim 4, further comprising a temperature sensor for sensing the temperature of the engine and generating a corresponding output signal, said control means being operable to increase the corrected amount of injection fuel in accordance with the decreasing engine temperature.

6. An air/fuel ratio control apparatus according to claim 5, wherein the corrected amount of fuel $Q_D$ is given by the sum of a basic fuel amount $Q_0$ and a correction fuel amount $Q_D$, the basic fuel amount being calculated from the number of revolutions per minute of the engine and the charging efficiency of the intake air, the correction fuel amount $Q_D$ being calculated as follows:

$$Q_D = K_2 \times \delta P_b$$

where $K_2$ is a constant which varies depending upon the temperature of the engine; and $\delta P_b$ is the deviation in the engine operating parameter between two consecutive points in time.

* * * * *